United States Patent [19]

Faber et al.

[11] Patent Number: 4,710,103

[45] Date of Patent: Dec. 1, 1987

[54] METHOD FOR FASTENING BLADES ON THE PERIPHERY OF THE ROTOR BODY OF A STEAM TURBINE AND THE TURBO-MACHINE PRODUCED BY THE METHOD

[75] Inventors: Guy Faber; Gottfried Kuhnen, both of Oberrohrdorf, Switzerland

[73] Assignee: BBC Brown, Boveri & Company, Limited, Baden, Switzerland

[21] Appl. No.: 873,605

[22] Filed: Jun. 11, 1986

[30] Foreign Application Priority Data

Jun. 18, 1985 [DE] Fed. Rep. of Germany ....... 3521664

[51] Int. Cl.$^4$ .......................... F01D 5/30; B23P 15/02; B21K 23/00
[52] U.S. Cl. .......................... 416/219 R; 29/156.8 R; 29/458; 29/527.6; 29/DIG. 26; 29/DIG. 48; 228/208; 228/263.15; 416/213 R; 416/215; 416/241 R; 416/244 A
[58] Field of Search ............ 29/156.8 R, 527.1, 527.5, 29/527.6, 458, DIG. 26, DIG. 48; 219/146.1, 761; 228/208, 263.15; 416/213 R, 213 A, 241 R, 244 A, 215, 216, 219 R

[56] References Cited

U.S. PATENT DOCUMENTS

| 3,975,612 | 8/1976 | Nakazaki et al. | 29/156.8 R X |
| 4,214,906 | 7/1980 | Langer et al. | 416/213 R |
| 4,288,677 | 9/1981 | Sakata et al. | 416/213 R X |
| 4,426,426 | 1/1984 | Mühlberger | 228/263.15 X |

FOREIGN PATENT DOCUMENTS

| 114893 | 8/1984 | European Pat. Off. . |
| 2428826 | 1/1975 | Fed. Rep. of Germany ..... 29/156.8 R |
| 2320186 | 6/1977 | Fed. Rep. of Germany . |

Primary Examiner—Howard N. Goldberg
Assistant Examiner—Ronald S. Wallace
Attorney, Agent, or Firm—Burns, Doane, Swecker & Mathis

[57] ABSTRACT

Steam turbine blades are fastened in an outer layer of weld material applied by deposit welding to the outer surface of the rotor body, the composition of the weld material being optimally matched with respect to hot strength and/or corrosion resistance, in particular stress corrosion resistance, to the local mechanical, thermal and chemical requirements. A possible option is additionally to insert a deposit welded intermediate layer of medium alloying element content. Steels with 10-14% Cr, low carbon and additions of Mo and possibly V are preferred as the weld material for the layer.

18 Claims, 2 Drawing Figures

METHOD FOR FASTENING BLADES ON THE PERIPHERY OF THE ROTOR BODY OF A STEAM TURBINE AND THE TURBO-MACHINE PRODUCED BY THE METHOD

FIELD OF THE INVENTION

The invention relates to a method for fastening the blades on the periphery of the rotor body of a steam turbine.

BACKGROUND OF THE INVENTION

Steam turbines generally have a rotor which is designed as a hollow body (drum rotor), as a solid body (monoblock), or as a body made up of individual discs (bodies of equal strength) welded together. This rotor body then carries the blades on its periphery, the blades usually being firmly clamped mechanically, or wedged in some manner. Since the mechanical and thermal demands made on the different parts vary, they are usually produced from different materials. The clamping positions on the rotor surface are then found to be particularly critical. At these points, either high temperature, corrosion resistance and/or stress corrosion resistance are required, depending on the location. Conventional rotor bodies—independent of their geometrical construction—generally consist of a single material, usually heat treated throughout. For this purpose, low to medium alloy steels are usually employed. It follows, therefore, that the mechanical, thermal and chemical loads occurring in operation would make it very desirable to have staging of the material properties, particularly in the radial direction.

It has already been proposed that turbine rotors be manufactured completely or partially of weld material, spiral layers being applied by welding runs on a relatively thin body of rotation—"build-up welding" (see DE-B-2 320 186). Protective surfaces produced by weld applications are also known (see, for example, EP-A-0 114 893).

Up to now, welding technology has been used for fastening blades only in the manufacture of impulse wheels. In this case, the blades are individually welded directly onto the rotor body. On the other hand, specialists have avoided the mechanical fastening of turbine blades in weld material because its properties were not sufficient for the chemical attack or mechanical loads at the temperatures involved. For the deposit welding described above, steels with a low C content were always used in the interests of good weldability. However, these steels have practically no hot strength. The same applies to the locations in the turbine where high mechanical strength and resistance to stress corrosion in condensed steam is demanded at low temperatures. Here again, no feasible way of using welding technology has been demonstrated (prejudice against fastening blades in weld material).

The objective of the invention is to provide a method of fastening blades on the periphery of a rotor body, the method ensuring optimum utilization of the properties of the materials used to meet the differing loads corresponding to the various locations, and being equally suitable for new manufacture and for repairs to existing rotors. The intention is that the method should be simple, involve less complication and be economical.

BRIEF DESCRIPTION OF THE DRAWINGS

The invention is described by the following embodiment examples explained in more detail by figures.

In these.

DETAILED DESCRIPTION OF THE INVENTION

Figure 1:
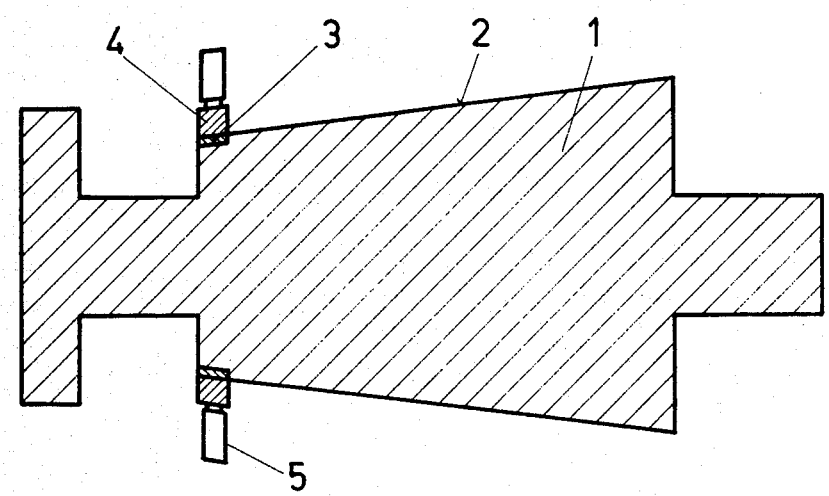
FIG. 1 is a schematic longitudinal cross section through a high pressure rotor with a deposit welded ring at one end.

FIG. 1 shows the longitudinal section through a high pressure rotor of a steam turbine with a ring welded on at the smaller diameter end. 1 is the rotor body, consisting of a low alloy steel. 2 represents the outside surface of the rotor body 1. 3 is an intermediate layer of weld material produced by deposit welding. 4 is an outer layer of weld material, also manufactured by deposit welding and carrying the blades 5. The layer 4 consists of a more highly alloyed Cr steel, possibly with other alloying elements. The intermediate layer 3 is selected in such a way that its composition lies between that of the rotor body 1 and that of the outer layer 4.

Figure 2:
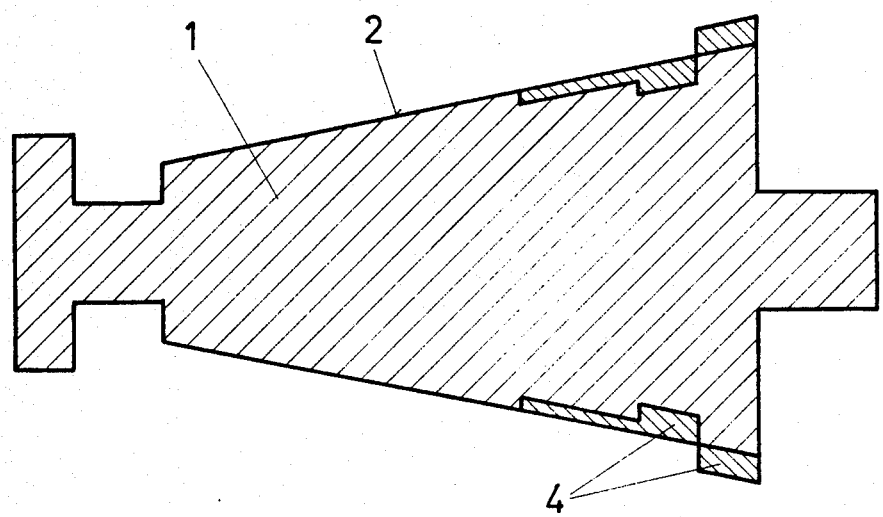
FIG. 2 is a schematic longitudinal cross section through a low pressure rotor with deposit welded, shell-shaped parts on the larger diameter end.

FIG. 2 shows, diagrammatically, a longitudinal section through a low pressure rotor of a steam turbine with deposit welded, shell-shaped parts at the larger diameter end. The rotor body 1 is covered for part of its outer surface by a stepped, outer layer 4 of weld material (deposit welding). In this case, the intermediate layer 3 of FIG. 1 is lacking.

DESIGN EXAMPLE I

See FIG. 1.

Deposit welding (build-up welding) was carried out in the form of a ring at the smaller diameter end of a rotor body 1 for a high pressure steam turbine, opposite the coupling flange. The rotor body 1 had the following composition:

C=0.23%
Si=0.12%
Mn=0.64%
Cr=1.6%
Mo=1.1%
V=0.28%
Fe=Remainder

After heat treatment, the rotor body 1 had the following strength values:

Yield stress=662 MPa
Tensile strength=810 MPa
Fracture extension=18.5%
Notch impact energy=43–65 Joule
(ISO V)

The dimensions of the rotor body 1 (measured over the assembly) were:

Assembly length=3500 mm
Maximum assembly diameter=1200 mm
Minimum assembly diameter=800 mm The rotor body 1 was preheated to a temperature of 250° C. An intermediate layer 3 of approximately 60 mm axial length and approximately 8 mm radial thickness was applied by deposit welding of three layers on the minimum assembly diameter end of the rotor body 1 on its outside surface 2, which had been recessed by appropriately turning it down. The intermediate layer 3 had the following composition:

C=0.19%
Cr=5.1%
Mo=1.2%
V=0.52%
Fe=Remainder

The intermediate layer 3 was kept at a temperature of 200° C. and an outer layer 4 applied to it by deposit welding. This annular layer 4 had an axial length of approximately 60 mm and a radial height (thickness) of approximately 50 mm and had the following composition:

C=0.19%
Cr=12.1%
Mo=1.2%
V=0.35%
Fe=Remainder

After the deposit welding of the outer layer 4, the complete rotor body 1 was cooled to a temperature of 100° C. and then immediately annealed at 680° C. The annealing serves to deliberately reduce the welding stresses, at least partially, and to produce a favorable grain structure of increased strength. After cooling, the rotor body 1, including the welded-on layer 4, was provided with the usual fastening grooves for the blades 5 by machining, and these blades were successively inserted. Testing showed that the weld material of the layer 4 had a higher hot strength than the base material of the rotor body 1 and that a crack-free connection could be achieved.

DESIGN EXAMPLE II

See FIG. 2.

A rotor body 1 of a low pressure steam turbine was provided with deposit welding at the thicker end of its external surface 2. The rotor body 1 had the following composition:

C=0.25%
Si=0.18%
Mn=0.58%
Cr=1.5%
Ni=2.9%
Mo=0.41%
Fe=Remainder

This material can be sensitive to stress corrosion in the initial condensation zone in the presence of critical quantities of impurities ($CO_2$, NaOH, etc.) in the steam.

After heat treatment, the rotor body 1 had the following strength figures:

Yield stress=820 MPa
Tensile strength=945 MPa
Fracture extension=17.5%
Notch impact energy=75–85 Joule
(ISO V)

The dimensions of the rotor body 1 (measured over the assembly) were:

Assembly length=4200 mm
Maximum assembly diameter=2600 mm
Minimum assembly diameter=1000 mm The rotor body 1 was preheated to a temperature of 300° C. An outer stepped layer 4 was applied by deposit welding at the maximum assembly diameter end of the rotor body 1, on its outside surface 2, which had been partially offset by turning it down. The individual steps of the layer 4 had differing axial lengths and radial thicknesses, the position and dimensions being determined by the stress corrosion sensitivity anticipated in the zone of initial condensation. The radial thickness of the layer 4 varied between 80 and 200 mm. No intermediate layer 3 (cf. FIG. 1) was applied. The outer layer 4 had the following composition:

C=0.2%
Cr=12.8%
Mo=1.2%
Fe=Remainder

After the deposit welding, the complete rotor body 1 including the layer 4 was cooled to a temperature of 120° C. and immediately annealed at 630° C. The further steps in the process took place in a manner analogous to those given under Example I. The intermediate layer 3 (cf. FIG. 1) necessary in the case of Example I can, generally speaking, be omitted because the steam temperatures in this part of the machine do not exceed 200° C. If, nevertheless, it is desired not to omit the intermediate layer 3, a steel with approximately 4% Cr content is recommended.

The invention is not limited to the embodiment examples. The preheating of the rotor body 1 before the deposit welding can preferably take place to 200°–300° C. in the case of high pressure rotors, and to 250°–350° C. in the case of low pressure rotors. The corresponding temperatures for the intermediate layer 3 are preferably 150°–300° C. and 200°–350° C., respectively. The cooling after welding should take place to approximately 100°–120° C. The subsequent heat treatment (annealing) can, in general, preferably take place in the temperature range between 600° and 750° C. for between 1 and 10 hours.

A steel with the following composition is basically possible as the welding material for the outer layer 4:

C=0.06–0.26%
Cr=10–14%
Mo=0–2%
V=0–0.45%
Fe=Remainder

Preferred compositions for layer 4 are those with:

C=0.17–0.24%
Cr=12%
Mo=1%
Fe=Remainder with or without an additional 0.3% V.

Welding material with the following composition can, basically, be used for the intermediate layer 3:

C=0.1–0.26%
Cr=2–6%
Mo=0–2%
V=0–0.65%
Fe=Remainder

Preferred compositions for the intermediate layer 3 are those with:

C=0.15–0.2%
Cr=4–6%
Mo=1%
Fe=Remainder with or without an additional 0.5% V.

The advantages of the new blade fastening in the weld material (deposit welded body of rotation on the basic body of the rotor) lie in the possibility of optimum material selection for each particular load, which varies with location. In this manner, the conditions in both the high pressure and the low pressure wheels can be taken into account in the best possible manner.

We claim:

1. A rotor and blade arrangement for a steam turbine, comprising:
   a rotor body;

an outer layer applied to the rotor body comprising at least one welding run of a steel that is one of high temperature corrosion resistance and stress corrosion resistance;

said outer layer being machined for the purpose of receiving blades; and blades inserted into the machined outer layer.

2. The arrangement according to claim 1, further comprising an intermediate layer of weld material located between the rotor body and the outer layer.

3. The arrangement according to claim 2, wherein the intermediate layer comprises the following composition:
C=0.1-0.26%
Cr=2-6%
Mo=0-2%
V=0-0.65%
Fe=Remainder.

4. The arrangement according to claim 2, wherein the intermediate layer is recessed within the rotor body.

5. The arrangement according to claim 1, wherein the outer layer comprises the following composition:
C=0.06-0.26%
Cr=10-14%
Mo=0-2%
V=0-0.45%
Fe=Remainder.

6. The arrangement according to claim 1, wherein the rotor body comprises the following composition:
C=0.23%
Si=0.12%
Mn=0.64%
Cr=1.6%
Mo=1.1%
V=0.28%
Fe=Remainder.

7. The arrangement of claim 1, wherein the outer layer comprises a metallurgical composition that is different from the metallurgical composition of the rotor body.

8. A method for fastening blades on the periphery of a rotor body of a steam turbine by firmly clamping and wedging the blades in recesses and/or protrusions of the rotor body, comprising:

covering an annular portion of the outer surface of the rotor body, by means of deposit welding, with at least one layer, said at least one layer being formed by welding a run of one of a high temperature corrosion resistant and stress corrosion resistant steel, after solidification of the welding run, subjecting the part of the rotor body formed by deposit welding to machining by one of turning, milling and grinding for the purpose of forming at least one of a recess and a protrusion to receive the blades, and inserting the blades in said at least one machined layer of weld material.

9. Method as claimed in claim 8, wherein at least the part of the rotor body formed by deposit welding in the form of layers is subjected to a heat treatment in the temperature range between 600° and 750° C. for between 1 and 10 hours, before the insertion of the blades.

10. Method as claimed in claim 8, wherein a steel with the following composition is used as the weld material to be applied as an outer layer:
C=0.06-0.26%
Cr=10-14%
Mo=0-2%
V=0-0.45%
Fe=Remainder.

11. Method as claimed in claim 8, wherein a steel with the following composition is used as the weld material to be applied as the outer layer:
C=0.17-0.24%
Cr=12%
Mo=1%
Fe=Remainder.

12. Method as claimed in claim 8, wherein a steel with the following composition is used as the weld material to be applied as the outer layer:
C=0.17-0.24%
Cr=12%
Mo=1%
V=0.3%
Fe=Remainder.

13. Method as claimed in claim 8, wherein on the rotor body, an intermediate layer is first applied, and wherein a further, outer layer is applied to this intermediate layer.

14. Method as claimed in claim 13, wherein a steel with the following composition is used as the weld material to be deposited for the intermediate layer:
C=0.1-0.26%
Cr=2-6%
Mo=0-2%
V=0-0.65%
Fe=Remainder.

15. Method as claimed in claim 13, wherein a steel with the following composition is used as the weld material to be deposited for the intermediate layer:
C=0.15-0.2%
Cr=4-6%
Mo=1%
Fe=Remainder.

16. Method as claimed in claim 13, wherein a steel with the following composition is used as the weld material to be deposited for the intermediate layer:
C=0.15-0.2%
Cr=4-6%
Mo=1%
V=0.5%
Fe=Remainder.

17. Method as claimed in claim 8, wherein the rotor body comprises the following composition:
C=0.23%
Si=0.12%
Mn=0.64%
Cr=1.6%
Mo=1.1%
V=0.28%
Fe=Remainder.

18. The arrangement of claim 8, wherein the outer layer comprises a metallurgical composition that is different from the metallurgical composition of the rotor body.

* * * * *